United States Patent Office 2,842,836
Patented July 15, 1958

2,842,836

MOLDABLE BODY, SHAPED METAL ARTICLE AND METHOD OF MAKING THE SAME

Johannes N. Hiensch, Swarthmore, Pa.

No Drawing. Application December 23, 1954
Serial No. 477,401

13 Claims. (Cl. 29—182)

The present invention relates to a novel method of making shaped metallic articles; and, more particularly, it relates to a method of making molds, mold bodies or supports, dies, patterns, and the like, of metal by working and shaping plastic metal mixes. The invention relates especially to a novel method of making molds, mold bodies or supports, dies and patterns of true dimensions and shape, to the resulting product, and to a moldable metallic body from which such products may be prepared.

Metal articles have been made by pressing, under high pressure in special dies, metal powder into the desired shape and sintering the resulting shaped body. Because this procedure is limited to the formation of simple shapes and because of the substantial shrinkage that takes place during sintering, the manufacture of molds, dies, patterns and the like by this procedure, is not practical. The necessity of an expensive die or mold limits powder metallurgy to mass production operations. Molds, for the casting of relatively low melting metals or the casting or injection molding of plastics, are normally made by machining metal blocks or blanks. Such molds must be provided with vents to permit the escape of the gases present in the molds and generated during molding; otherwise they would be completely impervious to the passage of gases.

In many cases, the working surface of a mold should be heat resistant. In other cases abrasion resistance is more important; while, in still other cases, corrosion resistance is required. There are, of course, alloys which possess one or the other of these properties to a high degree. However, since the alloys must be machinable in order to make molds therefrom, not all such alloys can be used, and the metal of the ultimate mold is generally a compromise between machinability, on the one hand, and the desired heat, abrasion or corrosion resistance, on the other.

It has long been known that amalgams can be prepared by dissolving metals in mercury to provide masses varying in consistency from a fluidity similar to that of mercury itself to a doughlike consistency as is common with dental amalgams. The character of the amalgam depends, of course, upon the nature of the metal or metals dissolved therein. When the lower melting metals, such as those melting substantially below about 850° C., for example, tin, bismuth, cadmium, and the like, or combinations of metals providing alloys melting in this range, are dissolved in mercury, alloys with mercury are formed which possess definite melting points or ranges. Such products melt when heated and cannot be sintered, and very often one or more of the metals dissolved therein volatilizes with the mercury. Some metals and alloys or combinations of metals forming, upon solution in mercury, alloys with each other, melting above about 850° C., produce masses from which the mercury itself can be removed by heating without melting the mass. When such masses are heated to vaporize and drive off the mercury and to sinter the dissolved metal the latter metal is left in the form of a highly porous spongy mass having poor structural strength. Moreover, during this heating operation the product generally shrinks and warps substantially, the exact amount of shrinkage and warpage depending upon the amount of metal dissolved in the mercury. For example, a 45% amalgam of copper, which is the maximum amount of copper that can be dissolved in mercury, will still give some shrinkage and warpage during sintering. However, because of the ease of working and shaping the plastic amalgams to form shaped products therefrom, it would be highly desirable if strong, relatively dense, metal bodies possessing the shape and dimensions imparted to them could be prepared by this means.

It is the principal object of the present invention to provide a method for preparing shaped metal articles from plastic metal mixes comprising mercury, which metal articles possess the true dimensions and shape initially imparted to them even after the mercury has been driven off by heat.

Another object of the present invention is to provide a novel method for producing hard, rigid, relatively dense but slightly porous metal bodies in any desired imparted shape and with accurately controlled dimensions.

A further object of the present invention is to provide a novel method of preparing from a plastic mixture of metals and comprising metal dissolved and dispersed in mercury, metal molds, mold bodies or supports, dies, patterns, or the like, retaining after sintering the true shape and dimensions imparted to them while in the plastic state.

Other objects including the provision of a novel metal article, more particularly a mold, mold body or support, die or pattern, will become apparent from a consideration of the following specification and the claims.

Copper and copper alloys which melt between about 1000 and 1150° C. are soluble in mercury. At concentrations of these materials in mercury below the atomic weight relationship between the dissolved substance and the mercury, the consistency of the solution is substantially that of a fluid or semi-fluid mass. As the concentration increases the consistency changes from the semi-fluid state to a plastic state and finally, at higher concentrations, usually substantially in excess of the atomic weight relationship, to a non-plastic mass lacking in cohesiveness much like moist sand. At the plastic state and at concentrations above the atomic weight relationship, these masses are age-hardenable, that is to say, they will, upon standing, set up to a hard, rigid state. Such age-hardened masses can be heated to vaporize and drive off the mercury without melting the material, leaving behind a spongy product which has shrunk and warped substantially during sintering. Metals melting above about 1150° C. are insufficiently soluble in mercury to provide products of value from the standpoint of the present invention.

The atomic weight relationship referred to above is the point at which there is one atomic weight of solute metal in solution per atomic weight of mercury. With copper, for example, the atomic weight relationship would be a solution of about 24% of copper in about 76% of mercury. This would provide a plastic mass. While the mass is in the plastic state it is cohesive and will retain shapes imparted to it. Within the plastic range the consistency of the plastic mass will vary depending upon the concentration of the dissolved substance in the mercury, from a relatively thin plastic mass to a stiff mass having the consistency of dough or modeling clay. When the mass is at the dough-like or modeling clay-like stage it is on the verge of losing its plasticity and of going over to a non-cohesive, moist sand-like condition, if additional copper or copper alloy becomes dissolved in the mercury, and this stage is referred to herein as the "critical stage." As stated, as the concentration of the copper or copper alloy in solution in the mercury increases above this critical stage the plasticity of the mass drops off sharply providing the stated incoherent, moist sand-like mass. It has been found, however, that, in order to provide shaped bodies of high structural strength and low or no shrinkage or warpage during sintering, the amount of metal actually present with the mercury should be well above this critical stage.

The process of the present invention comprises, therefore, providing a plastic, age-hardenable mass comprising metal particles in admixture with a solution of copper or copper alloy melting between about 1000 and about 1150° C. in mercury, the concentration of said copper or copper alloy dissolved in said mercury being at the critical stage, shaping the mass, age-hardening the shaped body and heating the hardened shaped body to drive off the mercury and to cause coalescence of the remaining metal. During this heating, or sintering, step there is no significant shrinkage or warpage of the shaped body, and the resulting sintered product is exceedingly strong and somewhat porous, the pores, however, being generally very small.

The material at the time of shaping will comprise a plastic, cohesive mass comprising discrete metal particles in admixture with a solution, in mercury, of copper or a copper alloy having a melting point between about 1000 and about 1150° C. The mass at the time of shaping will thus comprise two phases—the particulate phase made up of discrete metal particles undissolved in the mercury, and the continuous phase made up of the solution of copper or defined copper alloy dissolved in mercury. This continuous phase, or matrix, functions in the shaping of the mass as a binder for the particulate phase and hence may be referred to herein as the binder phase. The copper and copper alloys melting between about 1000° C. and about 1150° C. in solution in the mercury to provide the binder phase will be referred to herein as "solute metal" to distinguish from the discrete metal particles present, undissolved in the mass at the time of shaping.

The concentration of solute metal dissolved in the mercury to provide the binder phase at the time of shaping will be at the critical stage, that is, the concentration of solute metal dissolved in the mercury will be such that the consistency of the solution will have reached the dough- or modeling clay-like stage and such that any significant further amount of solute metal dissolved in the mercury will result in loss of plasticity and conversion of the solution to the moist sand-like condition referred to above. With pure copper and copper alloys melting within the stated range the critical stage is reached at concentrations of dissolved copper or copper alloy in the neighborhood of about 40–50%.

Copper by itself is a relatively soft metal, and in many applications it may be desirable that materials in addition to copper be present to provide alloys of different characteristics in the resulting product. Hence the solute metal dissolved in the mercury may be any copper alloy having a melting point within the stated range. Examples of copper alloys that may be employed are copper-beryllium, copper-manganese, copper-nickel, copper-cobalt, copper-zinc, copper-tin, copper-aluminum, copper-chromium, and various combinations of two or more metals, such as those set forth above, and others, with copper, such as copper-nickel-iron, tin-copper-nickel, and the like. In fact, the number of possible alloy combinations with copper which may be dissolved in the mercury to provide the binder phase is large. And therein lies one of the important features of the present invention, namely that molds, mold bodies or supports, dies or patterns may be constructed of alloys possessing desired properties, such as heat-, corrosion- and abrasion-resistance without compromise to provide machinability since no machining need be resorted to in order to provide shaped products of true dimensions in accordance with the present invention.

The metal particles making up the discontinuous particulate phase of the moldable mass at the time of shaping may be any metal such as the copper or copper alloys mentioned above as well as other metals and metal alloys which are difficult to dissolve in mercury such as tungsten, molybdenum, high melting alloys, for instance stainless steel, nickel-chromium (e. g. Nichrome type), nickel-molybdenum-iron (Inconel type), cobalt-chromium-tungsten, nickel-molybdenum-iron, nickel-chromium-molybdenum-tungsten, and the like. Here again as in the formulation of the binder phase solution, the nature of the particulate phase will be determined largely by the properties desired in the resulting product. The melting point of the metal from which the particulate phase is made will be at least about 1000° C. and preferably will be greater than about 1150° C., particularly to provide highly heat-resistant products.

The copper- or copper alloy-mercury solution, or binder phase, may be prepared following any one of a number of techniques. As is known, metals can be dissolved in mercury by electro-chemical means wherein mercury is made the anode in an electrolytic cell. Hence this method may be used to dissolve at least a portion of the copper or copper alloy in the mercury. The concentration of dissolved copper or copper alloy required in the binder phase can readily be provided by mixing, with mercury or a dilute copper or copper alloy solution in mercury, the metal sought to be dissolved in finely-divided form. Simple working or kneading of mercury with the finely-divided solute metal causes the metal to go into solution. Where the metal dissolved in the binder phase is to be a copper alloy, the pre-formed copper alloy in finely-divided form may be mixed with the mercury, or the metals, in finely-divided form, making up the copper alloy may be separately added to and dissolved in the mercury to provide the desired copper alloy in the mercury. At any rate, in preparing the binder phase, sufficient copper, copper alloy or mixed metals to provide the copper alloy in the mercury, is brought into solution in the mercury to provide an age-hardenable plastic mass at the critical stage.

The foregoing copper- or copper alloy-mercury solution is employed, as stated, as binder or cement for discrete metal particles in providing the moldable mix for shaping and sintering. In its broadest aspect, therefore, the process comprises combining the copper- or copper alloy-mercury binder solution and the discrete metal particles in the desired proportions. Preferably, the discrete particulate phase is present in the mercury before the ultimate copper- or copper alloy-mercury binder phase is formed. Thus, to mercury or to a solution of copper or copper alloy in mercury at a concentration below the critical stage, such as at a concentration between about 25 and about 35%, may be added metal particles comprising solute metal, in an amount to provide not only the desired concentration of copper or copper alloy in solution in the mercury to provide the binder phase but also the desired amount of discrete metal particles, and the resulting mixture worked. In this way it is possible to arrive at the critical stage of the binder phase gradually, the desired discrete particle phase already being present at the time of arrival at that stage, by controlled dissolution of solute metal into the mercury during working of the mixture until the concentration approaches, but does not reach that concentration at which the solution loses its plasticity.

The rate at which the solute metal goes into solution in mercury depends upon the nature of the metal and upon the size of the particles bearing it, the rate of dissolution being inversely proportional to the size of the particles. This latter fact may be relied upon to achieve controlled approach to the critical stage. Thus, metal going to make up the solute metal, i. e. copper or copper alloy, dissolved in the mercury, in very finely-divided form such as produced by electrochemical precipitation, may be mixed and worked with mercury in an amount rapidly to provide a concentration of metal dissolved in the mercury below the critical stage, more coarse particles, such as particles having an average size on the order of about .001–.01 inch, being employed to provide a more gradual rise in concentration at the critical stage. The more coarse particles may be added to the pre-formed solution, or a mixture of the fine and the coarse particles may be added to the mercury at the outset. Since the undissolved particles remain as such in the shaped product the size thereof may have a bearing on the porosity of the ultimate product; the larger the particles, the more porous the product may be and this factor may be utilized in controlling the porosity of the product.

In preparing the solute metal-mercury binder solution by dissolving metal from metal particles, such particles should be substantially free of an oxide layer in order that the metal be freely available for dissolution in the mercury. Oxide-free solute metal particles, such as copper particles, can readily be prepared by electrochemical precipitation methods. On the other hand, solute metal particles containing an oxide layer can be converted to the oxide-free condition by appropriate chemical means well known to those skilled in the art.

In accordance with the preferred embodiment of the invention, a mixture of metal particles comprising solute metal and a mercury solution of solute metal in a concentration below the critical range is worked until sufficient metal has dissolved from the particles into the solute metal-mercury solution binder phase to bring the concentration of solute metal therein to the critical stage, at which time working is stopped and the mass formed into the desired shape. This is preferably accomplished by first preparing a solution of solute metal in mercury at a concentration below the critical stage and then subsequently to mix with that solution metal particles comprising further solute metal in an amount not only to provide, by the time the critical stage is reached, the desired proportion of discrete particles, but also to provide at least sufficient solute metal to provide the critical stage in the binder solution. Thus, the amount of solute metal associated with the particles at the time they are mixed with the mercury solution may vary widely depending upon the concentration of solute metal already dissolved in the mercury and the concentration required to provide the critical stage as dictated by the particular solute metal employed. The amount that the solute metal associated with the particles is in excess of that providing the critical stage may also vary widely from a few percent, such as 2–3%, up to several hundred percent in excess since the discrete particles in the particulate phase at the time of shaping may be made up largely if not entirely of metal corresponding to solute metal.

One function of the particulate phase in the plastic mass after it is shaped is to serve as skeletal structure to impart strength and rigidity, much like the aggregate in concrete, and to prevent shrinkage and warpage during sintering. Ideally, therefore, as is the case with the aggregate in concrete, the undissolved particles in the mass after shaping will, in effect, just touch each other, the binding phase just filling in the interstices between the undissolved particles. In practice, however, such ideal situation is not always necessary. Thus, porosity in the final sintered product may be controlled according to the proportion of undissolved particles in the plastic mass at the time of shaping. Porosity and other properties in the final sintered product can also be varied by employing gradations or combinations of different sized particles such as a mixture of relatively fine and relatively coarse particles, the fine particles exerting a filling action in the interstices between the larger particles.

Since some of the metal particles may become dissolved in the continuous binding phase during working of the mixture, such fact will be taken into consideration in figuring the ultimate volume relationship between the continuous binder phase and the void space between the metal particles in the discontinuous particulate phase. Furthermore, the particles in the particulate phase may take a wide variety of forms. For example, metal in fibrous form, such as pieces of fine wire, may be employed to provide additional reinforcing effect. In view of the foregoing it will be seen that, at the time of shaping, the particulate phase may range from as low as about 30% to as high as about 60–70% of the moldable mass.

After the solute metal-bearing particles have been mixed with the mercury solution of solute metal having a concentration of solute metal below the critical stage, the mixture is worked not only thoroughly to distribute the particles in the mercury, but also to facilitate dissolution of solute metal associated with the particles into the mercury. This working involves principally a kneading action wherein the solute metal-bearing particles are moved with respect to the continuous mercury phase. This working may be done by hand or mechanically as by suitable rolls. Since the amount of solute metal associated with the particles during this working will generally be in excess of that which will provide, upon dissolution in the mercury, a concentration at the critical stage, care must be exercised as the mass approaches the critical stage not to proceed beyond the point where the mass is plastic and formable. The arrival at the critical stage can readily be ascertained by observing the characteristics of the mix. The consistency of the mix at this stage is, as stated, similar to that of dough or modelling clay. It is at this stage that the mix must be formed into the desired shape. Of course, if the critical stage is exceeded during working, the mix can readily be reverted to a plastic consistency by the addition of a small amount of mercury, and such reconverted mix may then be worked further to regain the critical stage by further dissolution of solute metal therein.

The forming or shaping of the mass may be accomplished by a wide variety of means depending, for example, upon the use to which the shaped product is to be put. For example, it may be molded under pressure in a mold cavity. On the other hand, if it is to serve as a mold itself, it may be pressed around or about a pattern. The pattern may be made of any solid material, such as metal, wood, plastic, ceramic and the like. Mold cores can also be made by formation in a core box. Parting compositions may be employed, such as on the mold or pattern, to facilitate removal of the shaped body from the forming means. Wax, polyethylene, nitrocellulose, or mixtures thereof, may be employed for this purpose.

As is conventional in the preparation of metal-casting molds, cooling means, such as tubes through which cooling medium may be flowed, locating pins, reinforcement, and the like may be provided in or on the shaped body. As as also well known in the metal casting art, it is often desirable that the fact of the mold be less porous than the backing portion. In this event, the mass applied directly to the pattern may be made up of a mixture which will provide, upon sintering, a less porous mass than is the material which will be applied thereover as backing or support material which may be made up of a mixture providing a more porous mass. At this stage, other materials may be applied to the surface of the pattern, mold or other shaping devcie which, after sintering, will provide an adherent layer on the shaped body possessing specific desired properties such as increased heat-, corrosion- or abrasive resistance, increased smoothness, decreased porosity, and the like. For example, the surface of a mold pattern may be plated with nickel or a nickel-chromium alloy or coated with a ceramic material, and such plating or coating can be made to adhere to the shaped body applied thereover. It will be seen that one of the important features and objects of the present invention is the provision of a strong, rigid, shaped metal body possessing desired porosity characteristics to the surface of which may be applied a wide variety of finishes imparting desired properties.

Once the mass has been shaped, it is permitted to stand for a sufficient time to attain, by age-hardening, the structural strength required by subsequent handling. This period of aging will depend upon the nature of the materials in the mass, and may range from a few hours to a day or so. The length of time during which the shaped body is permitted to age and to harden for any particular case can readily be ascertained and will offer no problem to those skilled in the art.

The shaped age-hardened body is then subjected to a sintering operation. This sintering operation is for the purpose of removing the mercury and for coalescing by incipient fusion the remaining dissolved solute metal and undissolved particles into a rigid, structurally strong, metal body. While the temperature employed in this sintering operation will be above the boiling point of mercury, the exact temperature conditions employed may depend, to some extent, upon the nature of the other metals contained on the body. In any event, the body is generally heated to a red heat during a cycle during which the rate of heating and of cooling after the body has been sintered, is controlled to avoid damage to the body. During sintering non-oxidizing conditions will be employed, that is to say, sintering will take place in a neutral or reducing environment. Such conditions may readily be provided by surrounding the shaped body with an inert gas, such as hydrogen, carbon monoxide, or mixtures thereof.

The resulting sintered product is a structurally strong rigid body made up of all the materials except the mercury in a lattice-like structure. The body contains minute pores. The product of the invention differs from powder metallurgy products made by sintering pressed powders, in that, in the latter, each particle has an oxide film. In the product produced in accordance with the present invention, there are no oxide films on the metal, and, under a microscope, the product presents a continuous grainy structure while the pores are much smaller than in a pressed metal powder product. The product, because it retains the shape and dimensions imparted to it before sintering, and because of its strength and porous structure, is ideally suited as a mold for the casting of metals. If not previously provided as mentioned previously, special surface conditions may be produced on the sintered product, especially on the casting surface when it is to serve as a casting mold, for metals or plastics. Thus, more or less permanent surface finishes providing improved heat-, corrosion- or abrasive resistance may be applied as by chemical or electrochemical plating of various metals such as nickel, chromium, nickel-chromium alloys, and the like; or ceramic coatings may be applied.

In connection with the foregoing, one of the important uses of the metal body of the present invention is as a mold body or support to function as backing material for thin mold faces themselves insufficiently strong to serve alone as molds. In the well known "shell-molding" process, a mixture of sand and a solid, finely-divided thermosetting resin is applied to a heated pattern resulting in a relatively thin shell of resin-bonded sand. In casting metals into these shells granular backing material, such as steel shot, must be employed. During casting the shell disintegrates and the separation of the sand from the granular backing material is difficult. In accordance with the present invention, there may be prepared a metal mold body or support somewhat larger than the ultimate casting to be molded therein. For example, a clearance of 1/16–1/4 inch may be provided by using an enlarged pattern or by providing a layer of parting material of suitable thickness over the face of a regular pattern before shaping the metal body of the present invention thereon. Following production of the mold body or support, a shell, such as the resin-bonded sand shell mentioned above, may be provided therein. This can be accomplished by any one of several procedures. For example, the metal mold body or support may be heated, the sand-resin mixture applied to the inner face thereof and the whole assembly then applied to a heated pattern so that the resulting resin-bonded sand shell adheres to the metal mold body or support and also is provided with the desired molding face. The same thing may be accomplished by first applying the sand-resin mix to a heated pattern and applying the metal mold body or support thereover.

The following specific examples are given for the purpose of illustration only and are not to be considered as limiting the scope of the invention in any way.

*Example I*

Thirty parts, by weight, of finely-divided copper particles are mixed with 70 parts of mercury. The mixture is kneaded until all the copper goes into solution. The resulting mass is plastic and will harden if aged. To this solution are then added copper particles having particle sizes ranging from .003 to .006 of an inch in a proportion of about 40 parts by volume of solution per 100 parts by volume of copper particles. It has been determined that 50% of the apparent volume of this mass of copper particles is void space. Hence the proportion of solution to coarse copper particles is selected so that the copper particles after working of the mixture will substantially touch each other, the mercury solution just filling the interstices between the particles. The mixture is kneaded until it reaches a stiff, dough-like consistency. The mass is then immediately pressed about a metal pattern coated with paraffin as parting agent, and permitted to stand for about 10 hours until hard.

The hardened body is then removed from the pattern and slowly fired in a reducing atmosphere to red heat. No shrinkage at all takes place during this sintering. The sintered product is a bright, strong, somewhat porous article of pure copper, useful as a casting mold. The pores cannot be seen with the naked eye. A slight polishing gives a bright surface.

Articles of zinc, zinc alloys, type metal, aluminum, aluminum alloys, magnesium, magnesium alloys and brass are readily cast in this mold.

*Example II*

The process of Example I is followed using, however, in the preparation of the initial solution finely-divided particles of a 2½% beryllium-copper alloy.

Following sintering, the article is heat-treated in the conventional manner for beryllium-copper alloys to increase strength and hardness.

*Example III*

In this example, the procedure of Example I is employed except that in place of the copper particles added to the initial copper-mercury solution, particles of a 30% nickel-copper alloy are employed. During kneading of the mass, some of the nickel-copper alloy goes into solution in the mercury-copper solution.

*Example IV*

In this example, the procedure of Example I is followed using, however, particles of a 12% manganese-copper alloy in place of the copper particles added to the initial copper-mercury solution. During kneading some of the manganese-copper alloy goes into solution in the copper-mercury solution.

*Example V*

This example illustrates the formation of shaped structures from "Monel" metal (33% copper, 66% nickel and small additions of iron, silicon and manganese). Particles of nickel (with the necessary additions of iron, silicon and manganese) having an average particle size of .003 to .006 inch, are electroplated with copper. These particles are mixed, as in Example I, with a 30% copper solution in mercury prepared as in Example I, and the mixture kneaded. During kneading, the copper coating on the particles goes into solution first, then some nickel. When the critical stage is reached, the mass is formed and the shaped mass permitted to age harden. During age hardening, further diffusion of nickel into the copper mercury solution takes place. The shaped mass is then fired at red heat, during which further diffusion of nickel into the matrix takes place. No shrinkage takes place. The resulting Monel metal article retains the exact shape and dimensions imparted to it.

*Example VI*

In this example, the procedure of Example V is employed using, however, copper-coated stainless steel particles, to provide a shaped sintered body high in stainless steel content.

Considerable modification is possible in the selection of the various metals and combinations thereof employed in preparing the product of the present invention as well as in the exact techniques employed in preparing, finishing and utilizing the prodct without departing from the scope of the present invention.

I claim:

1. The method of making shaped metal articles which comprises, providing a mixture of metal particles and a continuous binding phase comprising an age-hardenable solution in mercury of metal selected from the group consisting of copper and copper alloys melting between about 1000 and about 1150° C., the concentration of metal dissolved in the mercury being just below that at which the solution loses its plasticity, shaping the resulting mass, age-hardening the shaped mass and then sintering the shaped mass.

2. The method of claim 1 wherein the metal in solution is copper.

3. The method of claim 1 wherein the metal in solution is a copper alloy having a melting point between about 1000 and about 1150° C.

4. The method of claim 1 wherein the metal particles have a melting point above about 1000° C.

5. The method of making shaped metal articles which comprises mixing together a solution in mercury of a metal selected from the group consisting of copper and copper alloys melting between about 1000 and about 1150° C. and discrete particles of metal comprising a metal selected from the group consisting of copper and metals which upon dissolution in the solution provide an alloy with copper having a melting point between about 1000 and about 1150° C., working the mixture until the concentration of metal dissolved in said mercury is just below that at which the solution loses its plasticity, the amount of metal particles being in excess of that required to provide said concentration whereby at the time said concentration is reached discrete metal particles of metal are present, shaping the resulting mass, age-hardening the shaped mass and then sintering the shaped mass.

6. The method of claim 5 wherein the concentration of solute metal in the mercury with which the discrete metal particles are mixed is between about 25 and about 35%.

7. The method of claim 5 wherein, at the time the mass is shaped, the discrete metal particles make up between about 30 and about 70% of the mass.

8. The method of making shaped metal articles which comprises dissolving copper in mercury, mixing with the resulting solution metal particles comprising a metal selected from the group consisting of copper and metals which upon dissolution in the copper-mercury solution provide an alloy with the copper therein having a melting point between about 1000 and about 1150° C., working the mixture until the concentration of metal dissolved in the mercury approaches but does not reach that at which the mass loses its plasticity, the amount of metal particles being in excess of that required to provide said concentration whereby at the time said concentration is reached discrete metal particles are present, shaping the resulting mass, age-hardening the shaped mass and then sintering the shaped mass.

9. The method of claim 8 wherein the concentration of copper in the initial solution is between about 25% and about 35%; and wherein, at the time the mass is shaped, the discrete particles make up between about 30 and about 70% of the mass.

10. The method of making molds, mold bodies, and supports which comprises, providing a mixture of metal particles and a continuous binding phase comprising an age-hardenable solution in mercury of metal selected from the group consisting of copper and copper alloys melting between about 1000 and about 1150° C., the concentration of metal dissolved in the mercury being just below that at which the solution loses its plasticity, pressing the resulting mass on a mold pattern to impart a predetermined shape thereto, age-hardening the shaped mass and then sintering the shaped mass.

11. The method of claim 10 wherein the shaped face of the product is provided with a layer possessing characteristics differing from those of the body.

12. The method of claim 10 wherein the pattern has a heavy layer of parting material thereover providing a clearance between the pattern proper and the imparted shape of the sintered product; and wherein a resin-bonded sand shell adhering to the molding face of the sintered product is provided.

13. A shaped metal article comprising metal particles fused in a matrix comprising a metal selected from the group consisting of copper and copper alloys melting between about 1000 and about 1150° C., and resulting from the sintering of a shaped mixture of discrete metal particles and a solution in mercury of a metal selected from the group consisting of copper and copper alloys melting between about 1000 and about 1150° C., in a concentration just below that at which the solution loses its plasticity.

References Cited in the file of this patent

UNITED STATES PATENTS

| | | |
|---|---|---|
| 269,636 | Canda | Dec. 26, 1882 |
| 295,456 | Starr | Mar. 18, 1884 |
| 489,077 | Harris | Jan. 3, 1893 |
| 1,026,344 | Coolidge | May 14, 1912 |
| 1,248,925 | Sandell | Dec. 4, 1917 |
| 2,281,991 | Poetschke | May 5, 1942 |

FOREIGN PATENTS

| | | |
|---|---|---|
| 295,163 | Great Britain | Aug. 9, 1928 |

OTHER REFERENCES

"Treatise on Powder Metallurgy," vol. I (Goetzel), pub. by Interscience Publishers, Inc., New York, 1950, pp. 713–715 are relied on.

"Metallurgical Dictionary (Henderson) pub. by Reinhold Pub. Corp., New York, 1953, page 7 relied on.

"Copper the Metal Its Alloys and Compounds" (Butts), pub. by Reinhold Publishing Corp., New York, 1954, p. 608 relied on.